3,058,980
SUBSTITUTION PRODUCTS OF BENZO-1,4-OXAZINE
Alex Berg, Biberach an der Riss, Germany, assignor to Dr. Karl Thomae G.m.b.H., Biberach an der Riss, Germany, a corporation of Germany
No Drawing. Filed July 19, 1960, Ser. No. 43,722
Claims priority, application Germany July 22, 1959
8 Claims. (Cl. 260—244)

This invention relates to substitution products of benzo-1,4-oxazine and to various methods of producing them.

More particularly, the present invention relates to substituted benzo-1,4-oxazines having the general structural formula

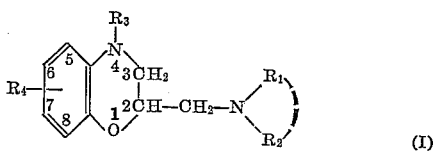

wherein $R_1$ is hydrogen or, together with the adjacent nitrogen atom and $R_2$, a heterocycle, such as piperidyl, pyrrolidyl, morpholyl and piperazyl;

$R_2$ is alkyl with 1 to 8 carbon atoms, aryl or aralkyl, which may be substituted on the aryl nucleus; or the carboxylic radical

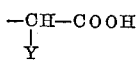

wherein Y is hydrogen, aryl, alkyl or aralkyl, as well as the corresponding carboxylic salts, esters and amides; or the radical

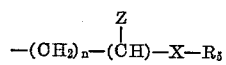

wherein Z is hydrogen or alkyl and $n$ is an integer from 0 to 6, inclusive, X is oxygen or sulfur and $R_5$ is hydrogen, alkyl, aryl or substituted aryl; or the radical

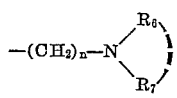

wherein $n$ is an integer from 1 to 6, inclusive, and $R_6$ and $R_7$ are hydrogen, alkyl, aryl, aralkyl, substituted aryl, ring-substituted aralkyl and, together with the adjacent nitrogen, 5- to 6-membered heterocycles, such as piperidyl, morpholyl, pyrrolidyl, piperazyl and the corresponding substituted heterocycles;

$R_3$ is alkyl with 1 to 8 carbon atoms, alkenyl with 3 to 5 carbon atoms, aryl, aralkyl, hydroxyalkyl or the radical

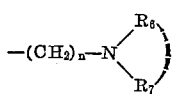

wherein $n$ is an integer from 1 to 3, inclusive, and $R_6$ and $R_7$ have the meanings previously defined; and $R_4$ is hydrogen, alkyl with 1 to 5 carbon atoms, aryl, aralkyl, substituted aryl, ring-substituted aralkyl, hydroxyl, alkoxy, aryloxy, aralkoxy, acyl, tertiary amino, acylamino, sulfonamyl, nitro or halogen;

and their non-toxic, pharmacologically acceptable acid addition salts.

The new compounds according to the present invention may be prepared by methods known per se; more particularly, the following methods have been found to be especially advantageous:

(1) Reaction of a substituted 2-halomethyl-benzo-1,4-oxazine (II) with a suitably substituted amine (IIa) in the presence of an agent which neutralizes a hydrogen halide, according to the following schematic reaction equation:

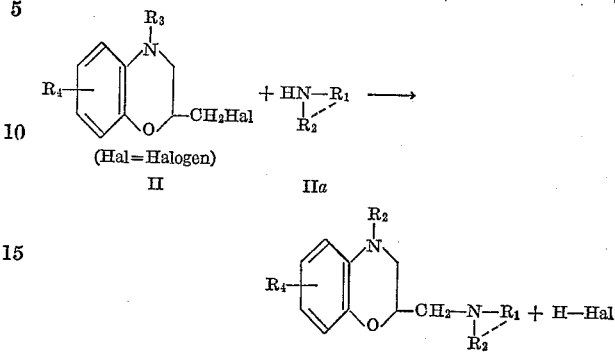

In the formulas of this equation $R_1$ to $R_4$ have the previously defined meanings and Hal represents halogen. In the event that $R_1$ is hydrogen, it may be exchanged by customary methods prior to the reaction for a radical which may subsequently readily be replaced by hydrogen, such as a benzyl group. This procedure is especially recommended when dealing with delicate amines. The reaction is advantageously carried out by reacting molar quantities of the individual reaction components. Suitable agents for neutralizing the hydrogen halide are, for example, triethylamine or a dialkyl-aniline and the like. In place of a separate agent capable of neutralizing the hydrogen halide, two to three mols of the amine IIa, i.e. one to two mols excess, may also be employed. The reaction is carried out in the presence or absence of a solvent, such as alcohol, especially ethanol, or hydrocarbons, especially benzene, etc., at temperatures between 20 and 200° C., preferably between 80 and 150° C. Reactions with amines IIa which have a boiling point lower than 80 to 150° C. are preferably carried out in a closed tube.

In the event that in the above reactions an amine IIa is used as one of the reaction components in which $R_1$ is a hydrogen atom and this hydrogen atom has been exchanged for a radical which is subsequently readily replaceable by a hydrogen atom, this radical is later split off again in such a manner that a secondary amino group is formed.

The production of the previously undisclosed halogen compounds II, which are used as starting materials in the present method, may be accomplished by reacting an o-aminophenol with an epihalogenhydrin to effect ring closure and form the corresponding hydroxy compound III, and transforming this hydroxy compound into the corresponding halogen compound II, for example with a phosphorus oxyhalide, in accordance with the following schematic reaction equation:

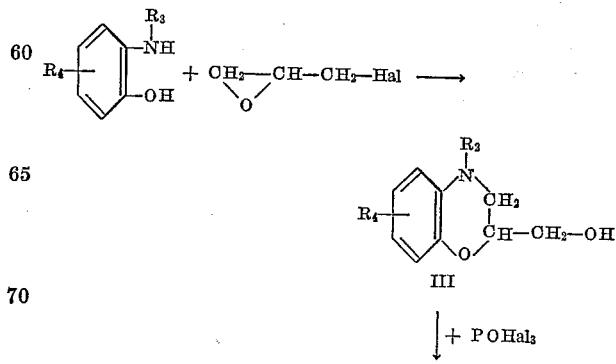

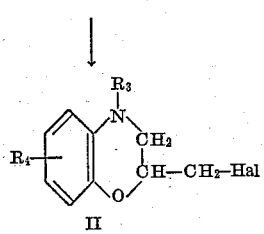

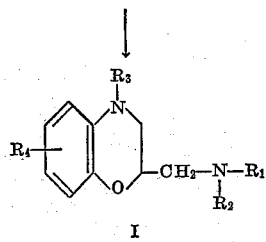

In the formulas of this equation the substituents $R_3$ to $R_4$ and Hal have, of course, the same meanings as previously defined.

In most instances it is not necessary to isolate the halomethyl compound II; instead, the raw product obtained after the reaction with the phosphorus oxyhalide may be reacted directly, without intermediate purification, with the desired amine IIa.

(2) For the production of compounds having the structural Formula I in which $R_1$ is hydrogen: reaction of 2-aminomethyl-benzo-1,4-oxazine with a suitable halogen compound IVa in the presence of an agent capable of neutralizing a hydrogen halide, in accordance with the following schematic reaction equation:

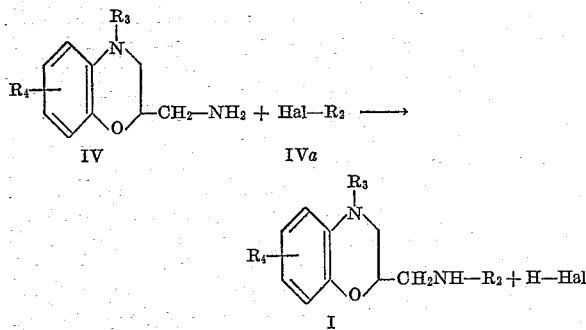

In the formulas of this equation substituents $R_2$ to $R_4$ and Hal have the previously defined meanings.

For this reaction of 2-aminomethyl-benzo-1,4-oxazines IV with the halogen compounds IVa, the same conditions apply as those described for process under 1 above.

Primary amines IV which are used as starting materials in this method and which have heretofore not yet been disclosed, may be produced by reacting the corresponding halogen compounds II with ammonia under the conditions described for the process under 1 above.

(3) Reaction of an o-aminophenol VI with a glycide VII, the hydroxyl group of which has been replaced by the radical of the secondary amine which is to be introduced, whereby this substituted glycide replaces the hydrogen of the amino group of the aminophenol VI, and subsequent cyclization of the compound V thus obtained to form compounds of the Formula I, according to the following schematic reaction equation:

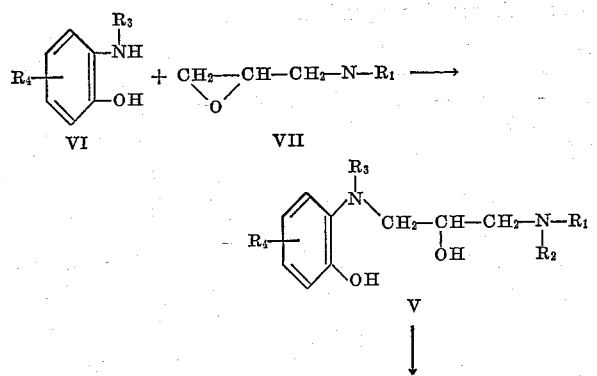

In the formulas of the above Equation $R_1$ to $R_4$ have the previously indicated meanings. In the event that $R_1$ is a hydrogen atom, it may be exchanged prior to the reaction for a radical which may subsequently be readily replaced by hydrogen, for example a benzyl group, by customary methods. This procedure is particularly advantageous in the present method.

The following examples will further illustrate the present invention and enable others skilled in the art to understand it more completely. It will be understood, however, that the invention is not limited to these illustrative examples.

EXAMPLE I (a) *Preparation of Starting Compound (II)—4-N-Methyl-2-Chloromethyl-Benzo-1-4-Oxazine*

1 mol 4 - N-methyl-2-hydroxymethyl-benzo-1,4-oxazine was added dropwise to 3.5 mol phosphorus oxychloride, accompanied by stirring, and care was taken by providing suitable cooling means that the reaction temperature remained below the boiling point of the phosphorus oxychloride. After all of the benzo-1,4-oxazine compound had been added, the reaction mixture was heated for one more hour at the boiling point in order to cause the reaction to go to completion. The excess phosphorus oxychloride was then distilled off in vacuo at a bath temperature of 150° C. The residual raw reaction product was then further reacted in this form with the desired amine IIa without intermediate purification.

If relatively expensive amines IIa are used for the subsequent reaction, it is recommended to employ the free, pure 4-N-methyl-2-chloromethyl-benzo-1,4 - oxazine. In order to obtain the pure product, the raw product is added, accompanied by stirring and intermittent cooling, to 400 cc. 5-N-sodium hydroxide which has a layer of 200 cc. benzene on its surface. After removal of the benzene from the organic phase, the free chloride is distilled off and is obtained in the form of a faintly yellow oil having a boiling point of 156° C. at 12 mm. Hg. Structural formula:

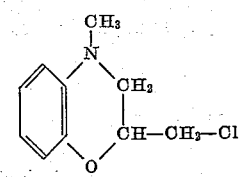

(b) *Preparation of 4-N-Methyl-2-Butylaminomethyl-Benzo-1,4-Oxazine*

A mixture of 198 gm. 4-methyl-2-chloromethyl-benzo-1,4-oxazine and 180 gm. butylamine was heated in a closed tube for six hours at 120° C. After allowing the contents of the tube to cool, they were made alkaline with 5 N sodium hydroxide and the resulting solution was exhaustively extracted with ether. The combined dried ether extracts were concentrated by evaporation and the residue was distilled. The product, having the structural formula

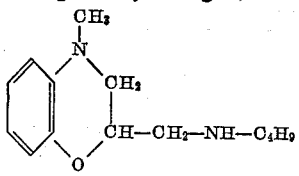

and a boiling point of 192–194° C. at 12 mm. Hg, was obtained in the form of a light yellow oil. Yield: 80 to 90% of theory.

EXAMPLE II
4-N-Ethyl-2-[β-(N,N-Dimethylamino)-Ethyl-Amino-Methyl]-Benzo-1,4-Oxazine A mixture of 210 gm. of 4-N-ethyl-2-chloromethyl-benzo-1,4-oxazine (obtained from 4-N-ethyl-2-hydroxymethyl-benzo-1,4-oxazine and phosphorus oxychloride according to the method described in Example Ia) and 300 gm. N,N-dimethylethylene diamine was refluxed for eight hours. The reaction mixture was then worked up as described in Example Ib. The product, having the structural formula

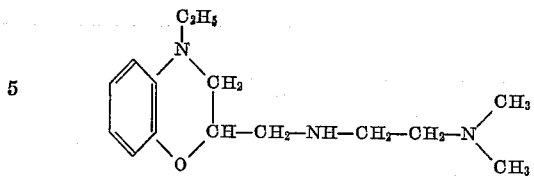

and a boiling point of 209–211° C. at 12 mm. Hg, was obtained in the form of a colorless oil; yield: 80 to 95% of theory.

The following table lists additional substituted benzo-1,4-oxazines of the Formula I which were produced by method Ib above, i.e. reaction of a compound of the Formula II with an amine of the Formula IIa. The table shows the identity of the starting materials, the meaning of substituted $R_1$ through $R_4$ in the end product of the Formula I and, under the heading "Properties," the boiling point of the end product and in some instances the melting point of the corresponding hydrochloric acid addition salt.

| Ex. No. | Starting materials | End product (Formula I) | | | | Properties | | |
|---|---|---|---|---|---|---|---|---|
| | | $R_1$ | $R_2$ | $R_3$ | $R_4$ | Free base | | Hydrochloride M.P. °C. |
| | | | | | | B.P. °C. | At mm. hg. | |
| 3 | 4-N-methyl-2-chloromethyl-benzo-1,4-oxazine and morpholine. | | $-CH_2-CH_2-O-CH_2-CH_2-$ | $CH_3$ | H | 140 | 0.01 | 232–235 |
| 4 | 4-N-methyl-2-chloromethyl-benzo-1,4-oxazine and N,N-diethylethylene-diamine. | H | $-CH_2-CH_2-N(C_2H_5)_2$ | $CH_3$ | H | 162–165 | 0.1 | 175–178 |
| 5 | 4-N-methyl-2-chloromethyl-benzo-1,4-oxazine and n-propylamine. | H | n-$C_3H_7$ | $CH_3$ | H | 180–185 | 12 | 180–185 |
| 6 | 4-N-methyl-2-chloromethyl-benzo-1,4-oxazine and ethanolamine. | H | $-CH_2-CH_2-OH$ | $CH_3$ | H | 225–230 | 12 | 180–183 |
| 7 | 4-N-methyl-2-chloromethyl-benzo-1,4-oxazine and N,N-dimethyl-ethylene-diamine. | H | $-CH_2-CH_2-N(CH_3)_2$ | $CH_3$ | H | 205–207 | 12 | 170 |
| 8 | 4-N-methyl-2-chloromethyl-benzo-1,4-oxazine and N,N-dimethyl-propylenediamine. | H | $-(CH_2)_3-N(CH_3)_2$ | $CH_3$ | H | 210–215 | 12 | 180–185 |
| 9 | 4-N-ethyl-2-chloromethyl-benzo-1,4-oxazine and N,N-dimethyl-propylenediamine. | H | $-CH_2-CH_2-CH_2N(CH_3)_2$ | $C_2H_5$ | H | 216–219 | 12 | 158–159 |
| 10 | 4-N-ethyl-2-chloromethyl-benzo-1,4-oxazine and ethanolamine. | H | $-CH_2-CH_2-OH$ | $C_2H_5$ | H | 224–227 | 12 | 166–167 |
| 11 | 4-N-ethyl-2-chloromethyl-benzo-1,4-oxazine and N,N-diethylethylenediamine. | H | $-CH_2-CH_2-N(C_2H_5)_2$ | $C_2H_5$ | H | 219–221 | 12 | |
| 12 | 4-N-(β-morpholyl-ethyl)-2-chloromethyl-benzo-1,4-oxazine and morpholine. | | $-CH_2-CH_2-O-CH_2-CH_2-$ | $-CH_2-CH_2-N\langle O\rangle$ | H | 185–195 | 0.01 | |
| 13 | 4-N-[β-(N,N-diethyl-ethylenediamino)-ethyl]-2-chloromethyl-benzo-1,4-oxazine and N,N-diethylethylenediamine. | H | $-CH_2-CH_2-N(C_2H_5)_2$ | $(C_2H_5)_2-N-CH_2$ $\quad CH_2$ $-CH_2-CH_2-NH$ | H | 195–210 | 0.05 | |
| 14 | 4-N-methyl-2-chloromethyl-benzo-1,4-oxazine and n-propanolamine. | H | $-CH_2-CH_2-\overset{OH}{C}H_2$ | $CH_3$ | H | 235–240 | 12 | |
| 15 | 4-N-methyl-2-chloromethyl-benzo-1,4-oxazine and β-hydroxy-propylamine. | H | $-CH_2-\overset{OH}{C}H-CH_3$ | $CH_3$ | H | 225–230 | 12 | 215–218 |
| 16 | 4-N-methyl-2-chloromethyl-benzo-1,4-oxazine and γ-methoxy-propylamine. | H | $-(CH_2)_3-OCH_3$ | $CH_3$ | H | 210–215 | 12 | 154–158 |

| Ex. No. | Starting materials | R₁ | R₂ | R₃ | R₄ | Free base B.P. °C. | At mm. hg. | Hydrochloride M.P. °C. |
|---|---|---|---|---|---|---|---|---|
| 17 | 4-N-ethyl-2-chloromethyl-benzo-1,4-oxazine and methylamine. | H | —CH₃ | C₂H₅ | H | 169–171 | 12 | 169–171 |
| 18 | 4-N-ethyl-2-chloromethyl-benzo-1,4-oxazine and n-butylamine. | H | —CH₂—CH₂—CH₂—CH₃ | C₂H₅ | H | 194–196 | 12 | 160 |
| 19 | 4-N-ethyl-2-chloromethyl-benzo-1,4-oxazine and β-hydroxy-propylamine. | H | —CH₂—CH(CH₃)—OH | C₂H₅ | H | 229–232 | 12 | 204–209 |
| 20 | 4-N-ethyl-2-chloromethyl-benzo-1,4-oxazine and morpholine. | —CH₂—CH₂—O—CH₂—CH₂— | | C₂H₅ | H | 212–214 | 12 | 218 |
| 21 | 4-N-ethyl-2-chloromethyl-benzo-1,4-oxazine and n-propylamine. | H | —(CH₂)₂—CH₃ | C₂H₅ | H | 174–176 | 12 | 187–190 |
| 22 | 4-N-ethyl-2-chloromethyl-benzo-1,4-oxazine and ethylamine. | H | —C₂H₅ | C₂H₅ | H | 179–181 | 12 | 162–164 |
| 23 | 4-N-ethyl-2-chloromethyl-benzo-1,4-oxazine and piperidine. | —CH₂—CH₂—CH₂—CH₂—CH₂— | | C₂H₅ | H | 205–207 | 12 | 222–225 |
| 24 | 4-N-ethyl-2-chloromethyl-benzo-1,4-oxazine and benzylamine. | H | —CH₂—C₆H₅ | C₂H₅ | H | 245–248 | 12 | 178 |
| 25 | 4-N-methyl-2-chloromethyl-benzo-1,4-oxazine and piperidine. | —CH₂—CH₂—CH₂—CH₂—CH₂— | | CH₃ | H | 200–205 | 12 | 194–198 |
| 26 | 4-N-methyl-2-chloromethyl-benzo-1,4-oxazine and N′-phenyl-piperazine. | —CH₂—CH₂—N(C₆H₅)—CH₂—CH₂— | | CH₃ | H | 225–231 | 0.1 | 232–233 |
| 27 | 4-N-[β-(n-butylamino)-ethyl]-2-chloromethyl-benzo-1,4-oxazine and n-butylamine. | H | —C₄H₉ | —CH₂—CH₂—NH—C₄H₉ | H | 168–170 | 0.05 | ---------- |
| 28 | 4-N-(β-diethylamino-ethyl)-2-chloromethyl-benzo-1,4-oxazine and morpholine. | —CH₂—CH₂—O—CH₂—CH₂— | | —CH₂—CH₂N(C₂H₅)₂ | H | 260–265 | 15 | ---------- |
| 29 | 4-N-methyl-2-chloromethyl-benzo-1,4-oxazine and methylamine. | H | —CH₃ | —CH₃ | H | 164–168 | 12 | 189–192 |
| 30 | 4-N-methyl-2-chloromethyl-benzo-1,4-oxazine and benzylamine. | H | —CH₂—C₆H₅ | —CH₃ | H | 240–245 | 12 | ---------- |
| 31 | 4-N-(β-diethylamino-ethyl)-2-chloromethyl-benzo-1,4-oxazine and γ-methoxy-propylamine. | H | —CH₂—CH₂—CH₂—OCH₃ | —CH₂—CH₂—N(C₂H₅)₂ | H | 190–196 | 0.1 | ---------- |
| 32 | 4-N-(β-diethylamino-ethyl)-2-chloromethyl-benzo-1,4-oxazine and isopropanolamine. | H | —CH(CH₃)—CH₂—OH | —CH₂—CH₂—N(C₂H₅)₂ | H | 270–275 | 12 | ---------- |
| 33 | 4-N-(β-diethylamino-ethyl)-2-chloromethyl-benzo-1,4-oxazine and piperidine. | —CH₂—CH₂—CH₂—CH₂—CH₂— | | —CH₂—CH₂—N(C₂H₅)₂ | H | 175–185 | 0.1 | ---------- |
| 34 | 4-N-(n-propyl)-2-chloromethyl-benzo-1,4-oxazine and ethanolamine. | H | —CH₂—CH₂—OH | —CH₂—CH₂—CH₃ | H | 220–224 | 12 | 200–205 |
| 35 | 4-N-(n-propyl)-2-chloromethyl-benzo-1,4-oxazine and morpholine. | —CH₂—CH₂—O—CH₂—CH₂— | | —CH₂—CH₂—CH₃ | H | 222–226 | 12 | 208–212 |
| 36 | 4-N-(n-propyl)-2-chloromethyl-benzo-1,4-oxazine and β-hydroxy-propylamine. | H | —CH₂—CH(OH)—CH₃ | —CH₂—CH₂—CH₃ | H | 225–230 | 12 | ---------- |
| 37 | 4-N-(n-propyl)-2-chloromethyl-benzo-1,4-oxazine and N,N-diethylethylenediamine. | H | —CH₂—CH₂—N(C₂H₅)₂ | —CH₂—CH₂—CH₃ | H | 230–235 | 12 | ---------- |
| 38 | 4-N-(n-propyl)-2-chloromethyl-benzo-1,4-oxazine and N,N-diethyl-propylenediamine. | H | —CH₂—CH₂—CH₂—N(C₂H₅)₂ | —CH₂—CH₂—CH₃ | H | 235–240 | 12 | ---------- |
| 39 | 4-N-(n-butyl)-2-chloromethyl-benzo-1,4-oxazine and morpholine. | —CH₂—CH₂—O—CH₂—CH₂— | | —CH₂—CH₂—CH₂—CH₃ | H | 230–233 | 12 | 183–186 |

| Ex. No. | Starting materials | R₁ | R₂ | R₃ | R₄ | Free base B.P. °C. | At mm. hg. | Hydrochloride M.P. °C. |
|---|---|---|---|---|---|---|---|---|
| 40 | 4-N-(n-propyl)-2-chloromethyl-benzo-1,4-oxazine and methylamine. | H | —CH₃ | —CH₂—CH₂—CH₃ | H | 178–182 | 12 | |
| 41 | 4-N-(n-propyl)-2-chloromethyl-benzo-1,4-oxazine and N,N-dimethyl-propylenediamine. | H | —(CH₂)₃—N(CH₃)₂ | —CH₂—CH₂—CH₃ | H | 230–235 | 12 | |
| 42 | 4-N-(n-propyl)-2-chloromethyl-benzo-1,4-oxazine and ethylamine. | H | —CH₂—CH₃ | —CH₂—CH₂—CH₃ | H | 187–190 | 12 | |
| 43 | 4-N-(n-propyl)-2-chloromethyl-benzo-1,4-oxazine and n-propylamine. | H | —(CH₂)₂—CH₃ | —CH₂—CH₂—CH₃ | H | 195–198 | 12 | |
| 44 | 4-N-(n-propyl)-2-chloromethyl-benzo-1,4-oxazine and n-butylamine. | H | —(CH₂)₃—CH₃ | —CH₂—CH₂—CH₃ | H | 205–208 | 12 | |
| 45 | 4-N-(n-propyl)-2-chloromethyl-benzo-1,4-oxazine and γ-methoxy-n-propylamine. | H | —(CH₂)₃—OCH₃ | —CH₂—CH₂—CH₃ | H | 250–253 | 12 | |
| 46 | 4-N-(n-butyl)-2-chloromethyl-benzo-1,4-oxazine and N,N-diethylpropylenediamine. | H | —(CH₂)₃N(C₂H₅)₂ | -n-C₄H₉ | H | 240–245 | 12 | 181 |
| 47 | 4-N-(n-butyl)-2-chloromethyl-benzo-1,4-oxazine and ethanolamine. | H | —CH₂—CH₂—OH | -n-C₄H₉ | H | 240–254 | 12 | |
| 48 | 4-N-ethyl-2-chloromethyl-benzo-1,4-oxazine and propanolamine. | H | —(CH₂)₃—OH | —C₂H₅ | H | 244–246 | 12 | |
| 49 | 4-N-ethyl-2-chloromethyl-benzo-1,4-oxazine and isopropylamine. | H | —CH(CH₃)₂ | —CH₂—CH₃ | H | 180–182 | 12 | |
| 50 | 4-N-(n-butyl)-2-chloromethyl-benzo-1,4-oxazine and piperidine. | —CH₂—CH₂—CH₂—CH₂—CH₂— | | -n-C₄H₉ | H | 195–200 | 15 | |
| 51 | 4-N-(n-butyl)-2-chloromethyl-benzo-1,4-oxazine and n-butylamine. | H | —C₄H₉(n) | -n-C₄H₉ | H | 217–222 | 12 | |
| 52 | 4-N-(n-butyl)-2-chloromethyl-benzo-1,4-oxazine and n-propylamine. | H | —CH₂—CH₂—CH₃ | -n-C₄H₉ | H | 210–215 | 12 | |
| 53 | 4-N-ethyl-2-chloromethyl-benzo-1,4-oxazine and N,N-diethyl-propylenediamine. | H | —(CH₂)₃N(C₂H₅)₂ | —C₂H₅ | H | 235–240 | 12 | |
| 54 | 4-N-ethyl-2-chloromethyl-benzo-1,4-oxazine and n-hexylamine. | H | —(CH₂)₅—CH₃ | —C₂H₅ | H | 223–226 | 12 | |
| 55 | 4-N-ethyl-2-chloromethyl-benzo-1,4-oxazine and propenylamine. | H | —CH₂—CH=CH₂ | —C₂H₅ | H | 193–195 | 12 | |
| 56 | 4-N-(n-propyl)-2-chloromethyl-benzo-1,4-oxazine and N,N-dimethyl-ethylenediamine. | H | —CH₂—CH₂—N(CH₃)₂ | —C₃H₇ | H | 224–228 | 12 | |
| 57 | 4-N-propenyl-2-chloromethyl-benzo-1,4-oxazine and n-hexylamine. | H | -n-C₆H₁₃ | —CH₂—CH=CH₂ | H | 223–225 | 12 | |
| 58 | 4-N-propenyl-2-chloromethyl-benzo-1,4-oxazine and morpholine. | —CH₂—CH₂—O—CH₂—CH₂— | | —CH₂—CH=CH₂ | H | 220–222 | 11 | |
| 59 | 4-N-(γ-morpholyl-propyl)-2-chloro-methyl-benzo-1,4-oxazine and n-butylamine. | H | -n-C₄H₉ | 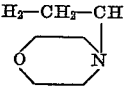 | H | 200–203 | 0.01 | |
| 60 | 4-N-propenyl-2-chloromethyl-benzo-1,4-oxazine and β-phenylethylamine. | H | —CH₂—CH₂— | —CH₂—CH=CH₂ | H | 263–265 | 11 | |
| 61 | 4-N-ethyl-7-methyl-2-chloromethyl-benzo-1,4-oxazine and n-propylamine. | H | —C₃H₇ | —C₂H₅ | 7-CH₃ | 202–204 | 12 | 208 |
| 62 | 4-N-ethyl-7-methyl-2-chloromethyl-benzo-1,4-oxazine and N,N-dimethyl-ethylenediamine. | H | —CH₂—CH₂—N(CH₃)₂ | —C₂H₅ | 7-CH₃ | 223–225 | 12 | |

| Ex. No. | Starting materials | $R_1$ | $R_2$ | $R_3$ | $R_4$ | Free base B.P. °C. | At mm. hg. | Hydrochloride M.P. °C. |
|---|---|---|---|---|---|---|---|---|
| 63 | 4-N-ethyl-7-methyl-2-chloromethyl-benzo-1,4-oxazine and N,N-diethylethylenediamine. | H | $-CH_2-CH_2-N(C_2H_5)_2$ | $-C_2H_5$ | 7-$CH_3$ | 236–238 | 12 | ---------- |
| 64 | 4-N-ethyl-7-methyl-2-chloromethyl-benzo-1,4-oxazine and β-hydroxy-propylamine. | H | $-CH_2-\overset{OH}{CH}-CH_3$ | $-C_2H_5$ | 7-$CH_3$ | 237–240 | 12 | 190 |
| 65 | 4-N-ethyl-7-methyl-2-chloromethyl-benzo-1,4-oxazine and morpholine. | | $-CH_2-CH_2-O-CH_2-CH_2-$ | $-C_2H_5$ | 7-$CH_3$ | 218–222 | 12 | 192 |
| 66 | 4-N-ethyl-7-methyl-2-chloromethyl-benzo-1,4-oxazine and n-butylamine. | H | $-C_4H_9$ | $-C_2H_5$ | 7-$CH_3$ | 206–209 | 12 | 183–185 |
| 67 | 4-N-ethyl-7-methyl-2-chloromethyl-benzo-1,4-oxazine and methylamine. | H | $-CH_3$ | $-C_2H_5$ | 7-$CH_3$ | 183–187 | 12 | 183–186 |
| 68 | 4-N-ethyl-7-methyl-2-chloromethyl-benzo-1,4-oxazine and ethylamine. | H | $-C_2H_5$ | $-C_2H_5$ | 7-$CH_3$ | 185 | 18 | 175 |
| 69 | 4-N-ethyl-7-methyl-2-chloromethyl-benzo-1,4-oxazine and ethanolamine. | H | $-CH_2-CH_2-OH$ | $-C_2H_5$ | 7-$CH_3$ | 256–260 | 26 | 143 |
| 70 | 4-N-ethyl-7-chloro-2-chloromethyl-benzo-1,4-oxazine and β-hydroxy-propylamine. | H | $-CH_2-\overset{OH}{CH}-CH_3$ | $-C_2H_5$ | 7-Cl | 198–203 | 0.3 | ---------- |
| 71 | 4-N-ethyl-7-chloro-2-chloromethyl-benzo-1,4-oxazine and ethanolamine. | H | $-CH_2-CH_2-OH$ | $-C_2H_5$ | 7-Cl | 205–210 | 0.5 | ---------- |
| 72 | 4-N-ethyl-7-chloro-2-chloromethyl-benzo-1,4-oxazine and morpholine. | | $-CH_2-CH_2-O-CH_2-CH_2-$ | $-C_2H_5$ | 7-Cl | 190–195 | 0.5 | 231 |
| 73 | 4-N-ethyl-7-chloro-2-chloromethyl-benzo-1,4-oxazine and N,N-diethyl-ethylenediamine. | H | $-CH_2-CH_2-N(CH_2-CH_3)_2$ | $-CH_2-CH_3$ | 7-Cl | 198–203 | 0.5 | ---------- |
| 74 | 4-N-ethyl-7-chloro-2-chloromethyl-benzo-1,4-oxazine and n-propanolamine. | H | $-CH_2-CH_2-CH_2-OH$ | $-CH_2-CH_3$ | 7-Cl | 245–250 | 15 | ---------- |
| 75 | 4-N-ethyl-7-chloro-2-chloromethyl-benzo-1,4-oxazine and benzylamine. | H | $-CH_2-C_6H_5$ | $-CH_2-CH_3$ | 7-Cl | 215–220 | 0.5 | 147 |
| 76 | 4-N-ethyl-7-chloro-2-chloromethyl-benzo-1,4-oxazine and n-butylamine. | H | $-CH_2-CH_2-CH_2-CH_3$ | $-CH_2-CH_3$ | 7-Cl | 175–180 | 0.5 | 175–177 |
| 77 | 4-N-ethyl-7-chloro-2-chloromethyl-benzo-1,4-oxazine and n-propylamine. | H | $-CH_2-CH_2-CH_3$ | $-CH_2-CH_3$ | 7-Cl | 160–165 | 0.5 | 206 |
| 78 | 4-N-ethyl-7-chloro-2-chloromethyl-benzo-1,4-oxazine and N,N-dimethyl-ethylenediamine. | H | $-CH_2-CH_2-N(CH_3)_2$ | $-CH_2-CH_3$ | 7-Cl | 175–180 | 0.3 | 228 |
| 79 | 4-N-ethyl-7-chloro-2-chloromethyl-benzo-1,4-oxazine and methylamine. | H | $-CH_3$ | $-CH_2-CH_3$ | 7-Cl | 155–160 | 1.0 | 110 |
| 80 | 4-N-ethyl-7-chloro-2-chloromethyl-benzo-1,4-oxazine and ethylamine. | H | $-CH_2-CH_3$ | $-CH_2-CH_3$ | 7-Cl | 154–158 | 0.2 | 185 |
| 81 | 4-N-ethyl-7-chloro-2-chloromethyl-benzo-1,4-oxazine and isobutylamine. | H | $-CH(CH_2-CH_3)CH_3$ | $-CH_2-CH_3$ | 7-Cl | 163–166 | 0.2 | 162–164 |
| 82 | 4-N-ethyl-7-chloro-2-chloromethyl-benzo-1,4-oxazine and N,N-diethyl-propylenediamine. | H | $-CH_2-CH_2-CH_2-N(CH_3-CH_2)_2$ | $-CH_2-CH_3$ | 7-Cl | 190–195 | 0.2 | 108 |

The substituted benzo-1,4-oxazines having the above-indicated Formula I exhibit useful pharmacodynamic properties. More particularly, they exhibit analgesic activities and prolong the barbiturate sleep.

The following statements are related to 4-N-ethyl-2-(methylamino-methyl)-benzo-1,4-oxazine, which is the compound according to Example 17, 4-N-ethyl-2-(butylamino-methyl)-benzo-1,4-oxazine, which is the compound according to Example 18, and 4-N-ethyl-2-[($\beta$-hydroxy-$\beta$-methyl)-ethyl]-benzo-1,4-oxazine, which is the compound according to Example 19.

The individual effective dose of those compounds is from 30 to 200 mgm. Individual doses of 40 to 80 mgm. are preferred. These individual doses should be administered one to three times a day.

The compounds in accordance with the present invention may be administered in dosage form by means of diverse compositions, such as tablets, sugar-coated pills, capsules, ampoules, suppositories, drops or the like.

The following examples will illustrate various compositions adapted for internal administration of the compounds in accordance with Examples 17, 18 and 19 above in dosage form.

EXAMPLE 83
TABLETS 1 tablet contains:

| | Mgm. |
|---|---|
| 4 - N-ethyl-2-(methylamino-methyl)-benzo-1,4-oxazine | 50.0 |
| Sec. calcium phosphate | 40.0 |
| Milk sugar | 70.0 |
| Potato starch (dry) | 40.0 |
| Soluble starch (APS-starch) | 5.0 |
| Talcum | 13.0 |
| Magnesium stearate | 2.0 |
| | 220.0 |

The 4-N-ethyl-2-(methylamino-methyl)-benzo-1,4-oxazine and the calcium phosphate are granulated with 80% alcohol by passing through a screen having a mesh width of 1 mm., and are then dried at 45° C. The milk sugar and the potato starch are granulated with 15% APS-starch by passing through a screen having a mesh width of 1 mm., and are then dried at 45° C. The dried granulates are admixed with the remaining adjuvant substances and pressed into tablets having a diameter of about 9 mm.

EXAMPLE 84
SUGAR-COATED PILLS

The tablets prepared in accordance with Example 83 are coated in known manner with a pill shell consisting substantially of sugar and talcum. The ready-made pills are polished by means of beeswax. Total weight of a pill: 350 mgm.

EXAMPLE 85
TABLETS 1 tablet contains:

| | Mgm. |
|---|---|
| 4 - N - ethyl-2-(butylamino-methyl)-benzo-1,4-ozazine | 80.0 |
| Milk sugar | 70.0 |
| Potato starch (dry) | 65.0 |
| Gelatin | 4.0 |
| Magnesium stearate | 1.0 |
| | 220.0 |

The 4 - N-ethyl-2-(butylamino-methyl)-benzo-1,4-oxazine, the milk sugar and potato starch (dry) are mixed together. The mixture is kneaded thoroughly with a 10% aqueous gelatin solution. The moist mass is granulated by passing through a screen having a mesh width of 1.5 mm., and is then dried at a temperature of 45° C. The dried granulate is admixed with magnesium stearate and potato starch. The mixture is pressed into tablets having a weight of 220 mgm. and a diameter of 9 mm.

EXAMPLE 86
SUGAR-COATED PILLS

The tablets prepared in accordance with Example 85 are coated with a thin shellac coating and are then coated in known manner with sugar sirup to form the pills.

EXAMPLE 87
CAPSULES 1 capsule contains:

| | Mgm. |
|---|---|
| 4 - N - ethyl - 2-[($\beta$-hydroxy-$\beta$-methyl)-ethyl]-benzo-1,4-oxazine | 60.0 |
| Milk sugar | 60.0 |
| Talcum | 10.0 |
| | 130.0 |

The substances are mixed together and filled into gelatin capsules of suitable size.

EXAMPLE 88
AMPOULES 1 ampoule contains:

| | Mgm. |
|---|---|
| 4 - N - ethyl - 2-[($\beta$-hydroxy-$\beta$-methyl)-ethyl]-benzo-1,4-oxazine in the form of its hydrochloride | 40.0 |
| Sodium chloride | 10.0 |
| Aqua dest, ad 2 ccm. | |

The 4-N-ethyl-2-[($\beta$-hydroxy-$\beta$-methyl)-ethyl]-benzo-1,4-oxazine in the form of the hydrochloride and the sodium chloride are dissolved in distilled water, and the solution is filled up to the corresponding volume. The resulting solution is filtered until free of suspended particles.

Filling: white 2 ccm.-ampoules
Sterilization: 20 minutes at 120° C.

EXAMPLE 89
SUPPOSITORIES 1 suppository contains:

| | Mgm. |
|---|---|
| 4 - N - ethyl - 2-(methylamino-methyl)-benzo-1,4-oxazine | 80.0 |
| Suppository mass (Witepsol H) | 1,620.0 |
| | 1,700.0 |

The finely powdered 4-N-ethyl-2-(methylamino-methyl)-benzo-1,4-oxazine having a particle size of less than 100 $\mu$ is added to the suppository mass which has been melted at 37° C. The mass is cooled with stirring to 34° C. and poured into precooled suppository molds of corresponding size.

EXAMPLE 90
DROPS

| | Gm. |
|---|---|
| 4 - N - ethyl-2-(butylamino-methyl)-benzo-1,4-oxazine | 4.0 |
| p-Hydroxy-methyl benzoate | 0.035 |
| p-Hydroxy-propyl benzoate | 0.015 |
| Ethanol (pure) | 10.0 |
| Saccharin-sod | 1.0 |
| Glycerin | 15.0 |
| Aromatic (e.g. Bitteressenz No. 25973 Haarm. & Reimer) | 3.0 |
| Distilled water, ad 100 ccm. | |

1 ccm. contains 40 mgm. 4-N-ethyl-2-(butylamino-methyl)-benzo-1,4-oxazine.

The p-hydroxy benzoic esters and the aromatic are dissolved in ethanol. The saccharin-sod. and the 4-N-ethyl - 2 - (butylamino - methyl) - benzo - 1,4 - oxazine are dissolved in water. The two solutions are mixed together, and the glycerin is addded thereto. The resulting solution is filtered until clear.

It is obvious that the compounds according to Examples 17, 18 and 19 are used merely as illustrative active ingredients in Examples 83 through 90 and may be replaced by any of the other substituted benzo-1,4-oxazines embraced by Formula I.

Since the compounds according to the present invention comprise at least one amino group attached to the side chain in the 2-position, they may readily be converted into non-toxic, pharmacologically acceptable acid addition salts by customary methods. In addition to the hydrochloric acid addition salts, which are illustrated in the above examples, other non-toxic, pharmacologically acceptable acid addition salts are, for example, those formed with hydrobromic acid, sulfuric acid, phosphoric acid, acetic acid, tartaric acid, ascorbic acid and the like.

While I have illustrated by invention with the aid of certain specific embodiments thereof, it will be readily apparent to others skilled in the art that the invention is not limited to these particular embodiments and that various changes and modifications may be made without departing from the spirit of the invention or the scope of the appended claims.

What I claim is:

1. Compounds selected from the group consisting of substituted benzo-1,4-oxazines of the formula

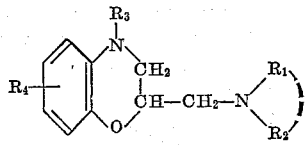

wherein $R_1$ is selected from the group consisting of hydrogen and, together with $R_2$ and the adjacent nitrogen atom, morpholyl, piperidyl and N-phenyl-piperazyl, $R_2$ is selected from the group consisting of lower alkyl, hydroxy-lower alkyl, lower alkyl-amino-lower alkyl, lower alkoxy-lower alkyl, phenyl-lower alkyl and lower alkenyl, $R_3$ is selected from the group consisting of lower alkyl, lower alkyl-amino-lower alkyl, morpholyl-lower alkyl and (N-lower alkyl-lower alkylene-diamino)-lower alkyl, and $R_4$ is selected from the group consisting of hydrogen, halogen and lower alkyl, and their non-toxic, pharmacologically acceptable acid addition salts.

2. 4 - N - ethyl - 2 - (methylamino-methyl) - benzo-1,4-oxazine.

3. 4 - N - ethyl - 2 - (butylamino - methyl) - benzo-1,4-oxazine.

4. 4 - N - ethyl - 2 - [($\beta$ - hydroxy - $\beta$ - methyl)-ethyl] benzo-1,4-oxazine.

5. 4 - N - ethyl - 2 - (propylamino - methyl) - benzo-1,4-oxazine.

6. 4 - N - methyl - 2 - (methylamino - methyl)-benzo-1,4-oxazine.

7. 4 - N - propyl - 2 - (morpholyl - methyl) - benzo-1,4-oxazine.

8. 4 - N - ethyl - 2 - [($\beta$ - N,N - dimethylamino-ethyl)-amino-methyl]-benzo-1,4oxazine.

No references cited.

UNITED STATES PATENT OFFICE
CERTIFICATE OF CORRECTION

Patent No. 3,058,980                  October 16, 1962

Alex Berg

It is hereby certified that error appears in the above numbered patent requiring correction and that the said Letters Patent should read as corrected below.

Column 2, lines 64 and 65, for that portion of the formula reading $$\overset{R_2}{|} \quad \text{read} \quad \overset{R_3}{|}$$

column 13, line 62, for "ozazine" read -- oxazine --; column 15, line 19, for "by" read -- my --.

Signed and sealed this 19th day of March 1963.

(SEAL)
Attest:

ESTON G. JOHNSON                         DAVID L. LADD

Attesting Officer                           Commissioner of Patents